Jan. 14, 1969   G. HIRSCH   3,422,233
TIME-INTERVAL SWITCHING DEVICE
Filed Dec. 30, 1966

United States Patent Office 3,422,233
Patented Jan. 14, 1969

3,422,233
TIME-INTERVAL SWITCHING DEVICE
George Hirsch, Tenafly, N.J. 07670
Continuation-in-part of application Ser. No. 534,920,
Jan. 10, 1966. This application Dec. 30, 1966, Ser.
No. 613,704
U.S. Cl. 200—38     21 Claims
Int. Cl. H01h 7/08; H01h 43/10

ABSTRACT OF THE DISCLOSURE

A cycle timing switch having a long "normal" interval such as hours and a short "operated" interval such as minutes, having an operating mechanism comprising a group of cams that act on the switch collectively when the cams are in their unique "operate" relationship, the cams being carried briefly into that relationship between long intervals by respective gears that are rotated at slightly different rates by a common drive.

---

This is a continuation-in-part of my application Ser. No. 534,920, filed Jan. 10, 1966 now abandoned.

The present invention relates to switching devices operable at relatively long intervals to provide short intervals of switch operation.

An example in which such switching devices are useful is in a refrigerator equipped with a heater that is to be turned on at widely separated times for melting accumulated frost. A switch-operating timer is used that advantageously utilizes the small motor of an air-circulating fan that operates continuously while the refrigerator operates, and the heater is "off." At intervals (as once every six hours, approximately) the timer turns the refrigerator off and it tunrs itself off, at the same time turning on the heater. When the heater raises the temperature enough, a bimetal switch restarts the timer, which then turns off the heater and restarts the refrigerator. None of the foregoing represents the present invention, but explains one application for the time-interval switching devices of the present invention.

An object of the present invention is to provide a novel time interval switching device of simple, low-cost construction that is nonetheless highly durable and reliable.

A further object of the invention resides in the provision of switch-operating gear assembly wherein the gears of a series carry respective switch-actuating elements that become effective to operate the switch part of the device at widely spaced time intervals when the switch actuating elements collectively assume a unique relationship.

Another object resides in the provision of a cam-bearing gear assembly arranged to operate a switch when a sequence of gears rotated at slightly different speeds carry the cams into a unique relationship that recurs only at widely separated times.

A further object resides in provision of a switch-operating gear assembly including a succession of coaxial gears bearing cams, the gears being rotated at slightly different rates and being effective to carry respective cams into a unique relationship at widely spaced times. A related object resides in providing such a switch-operating gear assembly wherein the cams carried by the gears are effective when they reach their unique relationship to expand the succession of gears into its switch-operating condition. A still further feature relates to the provision of balancing cam pairs on adjacent coaxial gears of such a time-interval switching device, to guard against cocking of the gears on their supporting shaft.

The nature of the invention, including the foregoing and other objects and novel features, will be more fully appreciated from the following detailed description of a presently preferred embodiment and certain modifications thereof, in which reference is made to the accompanying drawings.

Figure 1:
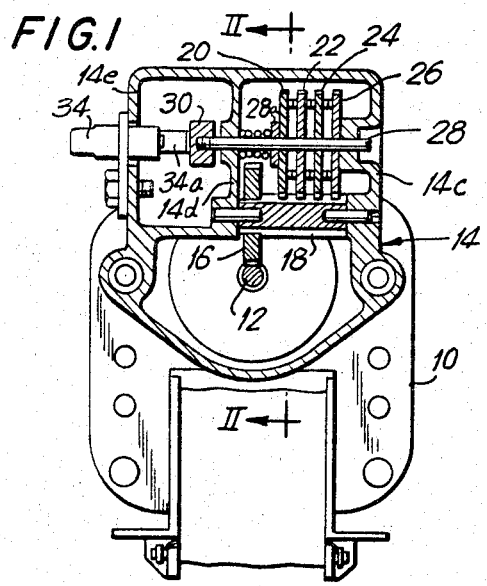
FIGURE 1 is lateral view, partly in cross-section as seen from plane I—I of FIG. 2, of a preferred time-interval switching device embodying various aspects of the invention.
Figure 2:
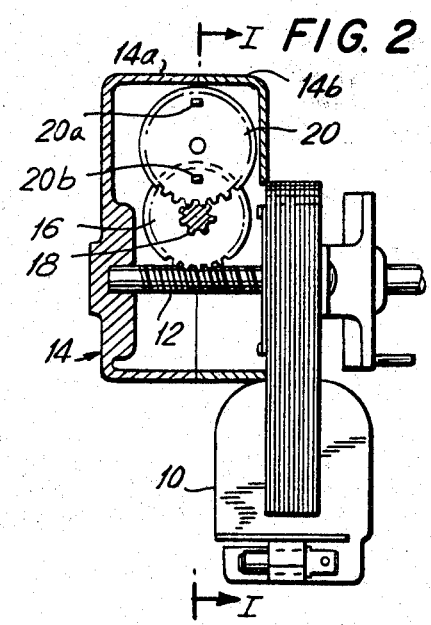
FIGURE 2 is a lateral view of the embodiment in FIG. 1, shown partly in cross-section at the plane II—II in FIG. 1.
Figure 3:
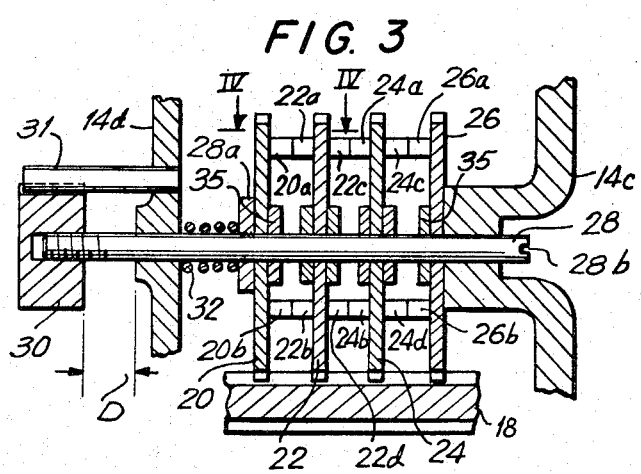
FIGURE 3 is an enlarged fragmentary cross-section of a portion of FIG. 1.

Referring now to FIGS 1–3, an electric motor 10 operates a worm 12 supported in bearings in a housing 14. The housing is conveniently divided into two parts 14a and 14b, as shown in FIG. 2. Worm 12 meshes with worm gear 16 secured to a shaft 18 rotatably supported by housing 14. Shaft 18 is grooved lengthwise or splined so as to constitute an elongated driving pinion for multiple gears 20, 22, 24 and 26. These gears are coaxial and thus they rotate in parallel planes, and they are of the same diameter. These gears have slightly different numbers of teeth meshed with pinion 18 so that they turn at different speeds. Shaft 28 has bearings in walls 14c and 14d in which the shaft is rotatable and axially slidable. Gears 20, 22, 24 and 26 are all freely rotatable on their common supporting shaft 28 and they are slidable relatively along the shaft 28. A disc 28a fixed to shaft 28 forms a shoulder against which gear 20 bears. When the gear assembly expands (as is described below) gear 20 is moved to the left in FIGS. 1 and 3, and shaft 28 moves to the left.

Figure 4:
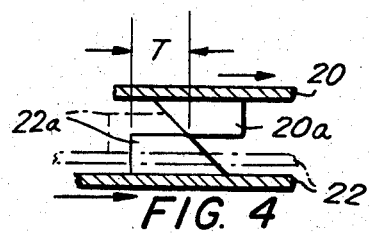
FIGURES 4, 5 and 6 are greatly enlarged fragmentary cross-sections showing part of the embodiment in FIGS. 1–3 at different times in the operation thereof, the cross-section being viewed from the line IV—IV in FIG. 3.
Figure 5:
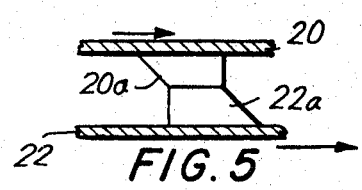
Figure 6:
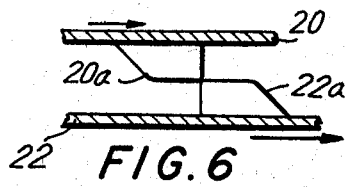

Gears 20 and 22 have companion cams 20a and 22a (FIG. 3). Gears 22 and 24 have companion cams 22c and 24a. Gears 24 and 26 have companion cams 24c and 26a. Because of the differential rotation of the gears, the cams of each pair are carried into and out of cooperation with each other, as illustrated in FIGS. 4–6. When the cams of a pair move into cooperation initially, the succession of gears expands along shaft 28. When all three pairs of cams are in cooperation, the gear assembly expands along shaft 28 to its maximum extent.

Each gear should slide smoothly along the shaft. Where each gear is thin compared with the diameter of the shaft, there is a danger of a gear becoming slanted on shaft 28. This could cause the gear to bind or become cocked on the shaft. It would then resist the sliding along the shaft. To guard against cocking of the gears in FIGS. 1–3, each cooperating pair of cams is balanced by a diametrically opposite concurrently cooperating pair of cams. Thus, cams 20a–22a, 22c–24a, 24c–26a have balancing pairs of cooperating cams 20b–22b, 22d–24b, and 24d–26b, respectively.

The cooperating cam pairs between any confronting or adjacent gears are at respectively different radii. Thus, cam 20a can cooperate with its companion cam 22a but not with cam 22b. Moreover, cam 20a comes into cooperation with its companion cam 22a at the same time that cam 20b and its companion cam 22b come into cooperation. Both pairs of cams are of the same angular extent, so they remain in cooperation during the same time intervals. In FIG. 3, certain cams project from the right-hand surface of three of the four gears in the assembly, e.g., cams 20a, 22c and 24c. These may be called "first cams," and they cooperate with gears on the left-hand surfaces of three of the four gears in assembly, e.g., cams 22a, 24a and 26a. The latter cams may be called "companion cams." Further, there are three more "first cams," 20b, 22d and 24d, and there are three individual "companion cams." The words "first cam" and "companion cam" are terms of reference used in the appended claims.

One end of shaft 28 is threaded into end cap 30. A pin 31 extending from wall 14d of the housing is received in a lateral groove in a cap 30. The end of shaft 28 opposite cap 30 has a slot 28b accessible externally of housing 14 for receiving a screw-driver.

A snap-acting switch 34 is mounted in the wall 14e of the housing. Switch 34 has an operating part 34a disposed along the axis of shaft 28 adjacent to cap 30. This switch could be of various forms. For example, it could be one movable contact of a relay having additional switching contacts appropriate to the application of the device. Preferably, switch 34 is a snap-acting switch that is biased to its normal condition with switch operator 34a adjacent to cap 30. Shift of cap 30 to the left moves switch operator 34a through an initial idle stroke, up to the point at which snap-operation occurs. For assurance that the switch will operate, the cap is moved beyond this snap-operating point. Snap-acting switches such as toggle switches and stressed leaf-spring switches such as the "Microswitch" are commercially available either as a bistable switch or a monostable switch. The latter type is involved here. The switch tends to return to its normal position by virtue of internal spring bias, and remains in its "operated" position only so long as operating effort is maintained.

When the snap-switch is released as a result of contraction of the gear assembly (when the companion cams pass out of cooperation) the switch operator 34a moves through a return stroke. The switch remains in its operating position during a stroke that must pass the snap-operating point by a "differential" stroke until a snap-return point of switch operation is reached. Where such a switch is used, the gear assembly must expand and contract to move cap 30 through a stroke that goes beyond the snap-operating point in one direction and beyond the snap-return point in the opposite direction.

At the right, gear 26 bears against housing wall 14c; and by virtue of the cooperating cams, gear 20 moves shaft 28 and cap 30 to the left as a unit to assume the configuration shown in FIG. 3. In this condition, cap 30 is separated from housing wall by a distance D. This distance is at least equal to the required operating stroke of the switch. The operating strokes of the cams collectively exceed the required operating stroke of the switch. Cap 30 is adjusted in relation to switch 34 so that when the cams of all but one pair are in cooperation, the snap-operating point is not reached, but so that cooperation of all the cam pairs reliably causes the snap-operating point to be passed.

Spring 32 biases unit 28, 30 to the right so that all elements of the assembly of gears are constantly biased against one another even when no pair of the cams are in cooperation. This sustained constraint provides further assurance of maintaining each of the gears perpendicular to the shaft, thereby guarding against cocking or binding against the shaft.

A series of spacing elements 35 are provided between gears 20, 22, 24 and 26. These elements provide bearing areas between confronting gears. The clearance between each pair of confronting gears, reduced by the thickness of spacers 35, limits the active stroke of the cams and companion cams of confronting gears. The combined thickness of the spacers is greater than the individual height of one of the cams, as measured from the surface of spacer 35. This arrangement assures some minimum spacing between each cam and the lateral face of the adjacent gear when the cams are not in cooperation, to minimize wear of the cams.

Figures 7, 7A:
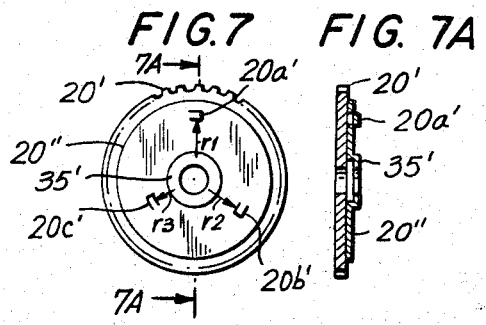
FIGURE 7 is a lateral view of a modified form of cam-bearing gear useful in the device of FIGS. 1–3 and FIG. 7A is a vertical cross-section thereof.

In FIGS. 7 and 7A, a modified form of gear is shown, in which the gear 20' has a flat lateral face to which is secured a separate stamping 20" embodying spacer 35' (replacing spacer 35 in FIG. 3) and embodying three cams 20a', 20b' and 20c' at 120-degree arcuate spacing and at mutually different radii. Gear 20' and its applique 20" replaces gear 20. Each of the other gears 22 and 24 of FIG. 3 would correspondingly have an applique 20" at both of its lateral faces, in each instance embodying three cams at different radii and at 120° spacing. The additional cam 20c' provides greater stability than where two diametrically opposite cam pairs are used, for assuring sliding of the gears along the shaft, rather than cocking of the gears on the shaft.

Operation of the mechanism may be now reviewed in connection with a practical example.

In this example, gears 20, 22, 24 and 26 have the following numbers of teeth, respectively: 48, 46, 44 and 42. In the apparatus as illustrated, the pairs of cams 20a–22a, 22c–24a and 24c–26a are aligned with each other as shown in FIG. 3 when the cams of each pair are in cooperation with each other. This relationship of alignment of the cam pairs when in cooperation is not essential in this embodiment, but it has practical value, as discussed further below. In any event, it forms a useful reference in the following discussion of the operation of the gear assembly.

When the 48-tooth gear completes one rotation, the 46-tooth gear also travels 48 teeth, and thus it has advanced 48/46 rotations. This is 2/46 or 1/23 more than a full rotation. After 23 rotations of the 48-tooth gear the 46-tooth gear has completed an extra rotation. Assuming cams 20a and 22a started in cooperation as in FIG. 3, they will resume this relationship after 23 rotations of gear 20.

Rotation of gears 22 and 24 carries cams 22c and 24a out of the cooperation shown in FIG. 3. After gear 22 rotates once, gear 24 has rotated 46/44 or 2/44 (1/22) of a rotation beyond a complete rotation of gear 22. Truning of gear 22 through 22 rotations will restore cams 22c and 24a to their initial cooperation. This occurs precisely at the completion of the 22nd rotation of gear 22. Thus it is seen that cams 22c and 24a, when returned to their initial cooperation, are returned to the same line of reference at which all the cams were aligned initially.

For each rotation of gear 20, cam 24a has advanced 48/44 or 4/44 (1/11) of 360°. This means cams 20a and 24a will be restored to alignment with each other at the original reference line after 11 rotations of gear 20. At that time they will both reach the initial line of reference represented in FIG. 3.

By like reasoning, it can be shown that cams 24c and 26a which start in alignment with the other cooperating cams will return to this reference line when they have rotated enough to bring them back into cooperation. Cam 26a reutrns to the reference line periodically during the rotation of gear 20. For each rotation of gear 20, gear 26 rotates 48/42 times or 6/42 (1/7) beyond a complete rotation. After 7 complete rotations of gear 20 cams 20a and 26a will be aligned with each other on the starting reference line of the cams in FIG. 3.

A complete cycle of operation of the gear assembly using the gears in this assumed example involves 23×11×7 or 1771 rotations of gear 20. This is the number of rotations of gear 20 needed for all the cams to leave the concurrently cooperating (and aligned) condition in FIG. 3 until they resume that concurrently cooperating (and aligned) condition. With a small A-C motor and a suitable worm-gear ratio, the described apparatus constitutes a (nominal) 6-hour interval timer.

The motor is the same unit that drives a fan blade at the right-hand end (FIG. 2) of the shaft of worm 12. As an indication of the proportions of a practical interval timer using the foregoing cams and gears, the outside length of the housing from wall 14c to wall 14e of that timer is less than two inches.

Above it has been noted that the cam pairs are not only in concurrent cooperation in FIG. 3, but that the cam pairs are aligned when they are in this cooperating condition. This alignment feature is not essential to the operation of the device in FIGS. 1–3. Thus, cam pairs 20a–22a, 22c–24a and 24c–26a could be located at the "12 o'clock" position, the "4 o'clock" position and the "8 o'clock" position, respectively, when concurrently in paired cooperation, and the operative principle would be the same. However, having the cams all in alignment when they all cooperate is a feature of detailed practical value.

In FIGS. 4, 5 and 6, the progressive relationship of a pair of cams is illustrated, as the gears carrying the cams rotate. It may be assumed that the cams have all reached an initial condition of full effectiveness in expanding the gear assembly, a condition idealized in FIG. 4. The cams have (idealized) top parts T that slide across one another during the further relative rotation of the gears. Ultimately the condition is reached as shown in FIG. 6, just prior to the cams dropping out of cooperation. After this occurs, the gears are allowed to contract along shaft 28 and the switch returns to normal.

The length T of the cams as measured in terms of the differential arc of rotation of any gear relative to its neighbor should be limited. An excessive length of cam could result in too-frequent concurrence of all the cam pairs being in cooperation, producing switch operation at times between the interval expected according to the example considered above. For precluding such premature operations of the switch, the tops T of the cams (during which the cams are fully effective in producing switch operation) should be limited to something less than the arc of differential rotation of each gear relative to its companion, measured at the completion of one rotation of the slower gear of the pair. On the other hand, the cam-top lengths determine the dwell of the switch in its operated condition; and in applications where a long time of switch operation is wanted, the tops of the cams should be long, within the foregoing limitation. In practice, considering the fact that the cams are usually rounded and not of the idealized forms in FIGS. 4–6, it will be sufficient to make the cams of reasonably limited arcuate extent; and if there should be any undesired switch operations within the intended intervals, this may be corrected by reducing the arcuate extent of the cams.

The right-hand end of shaft 28 in FIG. 2 is formed for carrying a fan blade for circulating air in a frost-free refrigerator as one application of the foregoing device. The motor operates the fan continuously between occurrences of switch operation. When the switch operates, a defrosting heater is turned on for a controlled period, after which there is another long period of refrigerator operation. Further detail of the cycle of controlling the refrigerator and the heater is believed unnecessary to an understanding of the present invention.

Figure 8:
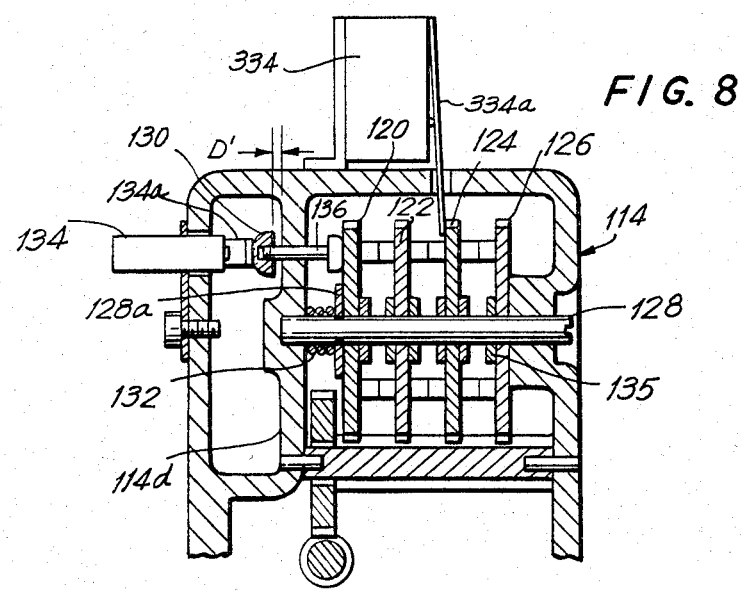
FIGURES 8 and 9 are fragmentary cross-sections of two modifications of the embodiment in FIGS. 1–6, viewed as in FIG. 3.

FIG. 8 illustrates a modification of the embodiment in FIGS. 1–3. In FIG. 8, the parts and their operation are the same in all respects except in the particulars here described. In this description, part members of the "100" series are used to represent comparable parts in FIGS. 1–6. In FIG. 8, switch actuating rod 136 replaces cap 30 of FIGS. 1 and 3. Rod 136 is slidable parallel to the axis of shaft 128, and moves endwise through a distance D' necessary to operate snap switch 134 and to allow its return (by internal bias) to its normal condition. In FIG. 8, each pair of cams is made large enough to operate rod 136 through the stroke D'; but when only two pairs of cams are in cooperation, gear 120 does not press against rod 136, and when only one pair of cams is in effect, there is a clearance roughly equal to D' between gear 120 and rod 136. Spring 132 biases the elements on shaft 128 so that they are always in contact with one another, thereby to avoid cocking.

Cap 130 of rod 136 at the right of housing wall 114d is lifted away from the housing wall only when the switch is to be operated, that is, when all three pairs of cams cooperate. When less than three cam pairs cooperate, rod 136 does not press against gear 120. In FIG. 8, rod 136 is shifted in its switch operating stroke during all of the time that the three cam pairs cooperate, rod 136 bearing against the end gear 120 of the gear assembly, but acting at a point off the axis of rotation of the gears.

Figure 9:
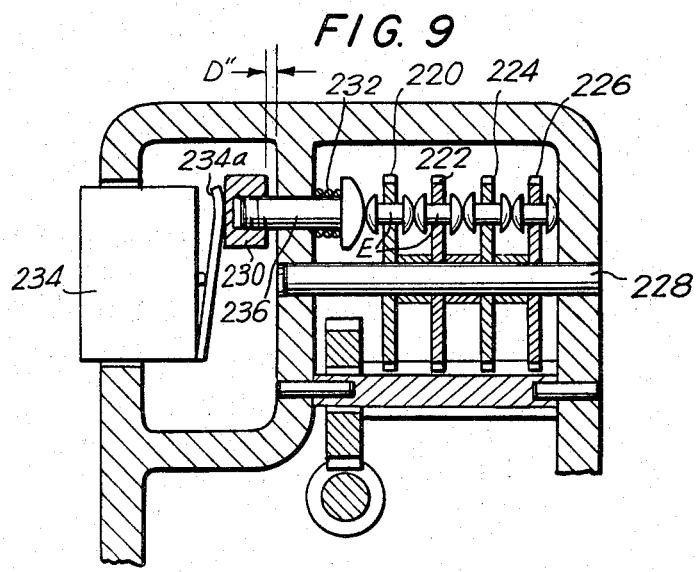
Figure 10:
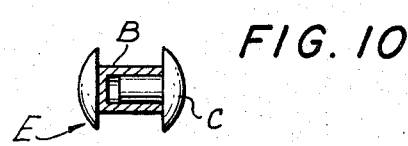
FIGURE 10 is an enlarged detail of a component in FIG. 9.

FIG. 9 illustrates an embodiment of certain of the aspects of the switching devices in FIGS. 1–6 and 8, but the device in FIG. 9 is of advantage where short-time operation is desired, together with a fast transition from the "normal" to the "operated" condition of the switch, and a fast reverse stroke. In FIG. 9, parts corresponding to those in FIGS. 1–6 are represented by the "200" series. Their relationship and operation are not repeated, in the interest of conciseness. In FIG. 9, all of the gears are rotatable on shaft 228, but they are not movable axially. Each gear carries a double-ended cam unit E that is formed as shown in FIG. 10, of a hollow rivet B and a solid rivet C force-fitted together and slidable in the respective gear. The heads of the rivets are contoured to function as cams. The stroke of each cam unit in its gear equals the necessary stroke of rod 236 in operating and restoring the switch.

In FIG. 9, switch lever 234a is operated by cap 230 carried by rod 236. The head of rod 236 is curved, to serve as a cam surface. Spring 232 biases rod 236 toward cam units E. Adjustment of rod 236 in cap 230 provides a limited stroke D" suitable for switch operation.

Careful review of FIG. 3 and its operation has shown that the cooperation of the cams with each other occurs when they are all in alignment and at a certain part of the rotation of all the gears. This property is utilized in FIG. 9, by locating rod 236 at the place where mutual alignment of cam units E recurs. In FIG. 9, as in FIG. 3, there is a relatively gradual build-up of cooperation among cam units E, at times when this is to occur. However, the switch 234 is abruptly closed and abruptly allowed to reopen, and it remains in its cam-operated condition for only a brief moment. This is because gear 220 carries its cam unit E past rod 236 rapidly, the whole process of switch operation from start to end taking place within a small fraction of the rotation of gear 220.

The fast-acting stroke of cap 230 in FIG. 9 is a particular advantage where the switch involved is not of the snap-acting type and where, nevertheless, fast movement of the switch contacts may be desired in making and breaking a circuit. Optionally, rod 236 could be omitted, simply by mounting switch 234 with its operator 234a in position for direct engagement by switch-actuating element E in gear 220 but only when this switch-actuating element E is in its projected, switch-actuating position. This is the condition of elements E illustrated in FIG. 9, where all the switch-actuating elements E must be aligned with each other before they can cause switch operation.

Hybrid arrangements are feasible, as where a single cam (like the head of cam E opposite rod 236) is arranged on gear 120 in position to cooperate with rod 136, thereby to provide the same quick action in operating the switch in FIG. 8 as described above in connection with FIG. 9.

In a further application of the switches in FIGS. 1–3 and 8 described above, the interval timing switch may be used (with appropriate driving speed of pinion 18) to control the lighting of an advertising display or the indexing of a changeable legend-bearing member forming part of an advertising display. In such application it may be desirable to create an additional changed lighting or other effect at more frequent intervals. This is achieved by means of an additional switch 334' (FIG. 8) mounted on housing 14 with its operator 334a' opposite one of the gears other than gear 120. Where switch operator 334a is mounted for operation by leftward shift of gear 124, switch 134 is operated once each time the differential rotation of gears 124 and 126 has proceeded far enough to carry the respective cams thereof into cooperation and thereby expand gear set 124, 126.

Figures 11, 12:
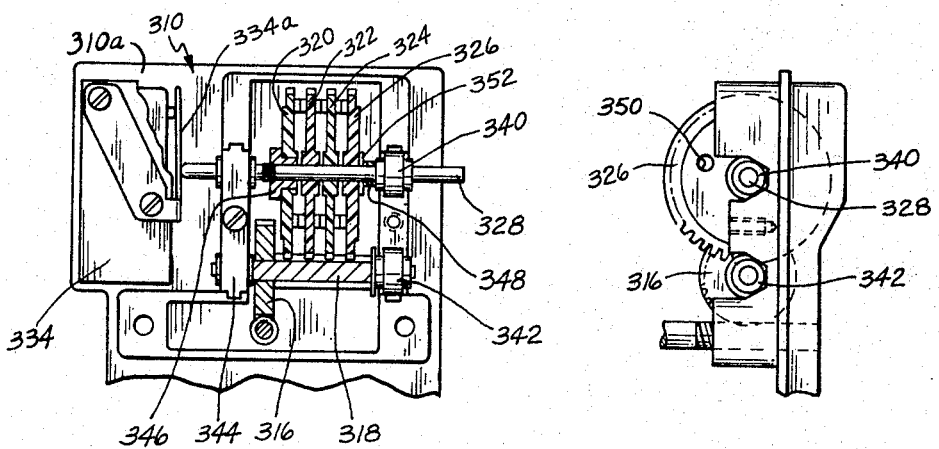
FIGURES 11 and 12 are fragmentary plan and a right-side elevation of a further embodiment.

A further embodiment of certain features of the invention is illustrated in FIGS. 11 and 12. This embodiment resembles the form in FIGS. 1-6, but it involves a modified arrangement (replacing knob 30 and pin 31) for achieving the desired relationship between the shaft and the switch. The embodiment in FIGS. 11 and 12 (as also that in FIGS. 1-6) takes into account the variations in dimensions of the parts occurring in production, and it insures effective switch operation when, and only when, all the cams come effectively into line. In FIGS. 11 and 12, numerals of the 300 series are used to designate like parts found in FIGS. 1-6, differences being pointed out in the description that follows.

The switch 334 and gearing 320, 322, 324 and 326 as well as pinion 318 and gear 316 are all carried in a frame 310 comprising a casting that is open at one side to receive the parts. A flange 310a extending integrally from the wall of the gear-containing cavity conveniently mounts the switch 334 in a fixed position with its actuating arm 334a in line with shaft 328. Bearings 340 at each end of shaft 328 have raised annular ribs (as shown) which are received in complementary grooves in the housing. Like bearings 342 are provided for the shaft of pinion 318. Bearings 340 and 342 are held in place by a resilient strap 344, screwed to a wall of the housing. (One strap 344 is omitted from the drawing for providing a better view of the bearing 340.)

Gears 320, 322, 324, 326 are all of a form that incorporates, integrally, all of the cams (e.g., as shown in FIG. 7) and the spacers (e.g., spacer 35, FIG. 3). These gears fit loosely on shaft 328 with the exception of gear 320. A bushing 346 is fixed rigidly to both shaft 328 and to gear 320. The plane of gear 320 is perpendicular to the axis of shaft 328. At the right-hand end of the gear assembly a sleeve 348 is provided, spacing gear 326 from the housing wall.

In assembling the timer, a subassembly of gears 320, 322, 324 and 326 on their shaft, with bearings 340 on the shaft, is dropped into place. Each of the gears has a hole 350 in position to be aligned with the other holes when two of the three pairs of cams are in their position required to extend the gear assembly endwise. This should be just short of switch actuation. With these holes aligned, the position of the switch-actuating end of shaft 328 is accurately gauged in relation to the switch by moving the shaft toward the switch and measuring the motion necessary to achieve switch actuation. At this time, sleeve 348 reacts against bearing 340. If the shaft requires too much displacement to operate the switch properly, then the additional shift of the shaft 328 necessary to operate the switch is known. The assembly of gears is removed, and then one or more washers can be assembled to the end of sleeve 348. Alternatively, a sleeve 348 of proper length is substituted to cause the required displacement of shaft 328 for causing proper switch operation by the shaft.

That gear 320 is fixed by bushing 346 against axial shift relative to the shaft while gear 326 is fixed against axial shift relative to the same frame which carries the switch enables the shaft to operate the switch in the axially expanded condition of the gear assembly. That gear 320 is fixed rigidly to shaft 328 enables gear 320 to prevent excessive tilting of the gears on the shaft, where such tilting could cause binding of a gear on the shaft. In this embodiment, spring 32 (FIG. 3) has been found unnecessary.

In the timer of FIGS. 11 and 12, worm gear 316 has 45 teeth, and meshes with a single-thread worm that is driven by a motor having a nominal speed of 3000 r.p.m. The set of four cam-bearing gears 320, 322, 324 and 326 have 54, 56, 58 and 60 teeth, respectively, and are driven by pinion 318 having 9 teeth. In this example, the whole cycle takes about 6 hours, and the period of time during which shaft 328 has shifted to the left in FIG. 11 sufficiently to operate the switch is about 5 to 10 seconds.

Holes 350 serve a further purpose. There is a condition represented by improperly related gears which would result in the three pairs of cams never becoming aligned simultaneously. This is ruled out by using holes 350 which assures the proper relationship between the gears.

In each of the examples above, the switch as illustrated is operated as a result of the thrust developed by the cams, collectively. In broad concept, this concurrent effect of the differentially rotated group of gears can be utilized otherwise to operate the switch. As a further example, it is contemplated that the plates of a clutch coaxial with the gears may be engaged by expansion of the set of gears, FIGS. 3 or 8; and in that case the driven clutch part may rotate a cam or a crank to operate the switch.

Pursuant to the patent statutes, the preferred embodiment of the invention has been disclosed, and various modifications have been noted as embodying the broader aspects of the invention. However, various other modifications and varied application of the novel concepts will be readily apparent to those skilled in the art. Consequently the invention should be construed broadly in accordance with its full spirit and scope.

What is claimed is:

1. A switching device operable at intervals, including a switch and an assembly for actuating said switch mechanically at intervals, said assembly including a series of at least three coaxial rotatably supported members, switch actuating formations carried by said members, respectively said switch-actuating formations being of only a small arcuate extent, and means for rotating said members progessively at slightly different rates so that the switch actuating formations collectively assume a switch-actuating relationship to each other after intervals of many rotations of each of said three members and said relationship is maintained only during a limited extent of rotation of said three members but of much larger arcuate extent than the small arcuate extent of each said switch actuating formation, said assembly including means for mechanically coupling said switch actuating formations to said switch for operating the latter during said much larger extent of rotation when the switch actuating formations are collectively in their switch-actuating relationship.

2. A switching device operable at intervals, comprising a switch-actuating assembly including a series of members supported for rotation in parallel planes, each of said members having a laterally projecting cam of limited arcuate extent for cooperation with a companion oppositely projecting cam of the next adjacent one of said members, said cams being supported for displacement perpendicular to said parallel planes, means for coupling said series of members for different rates of rotation for bringing said cams into concurrent cooperation with one another only at intervals, and a switch, said switching device including means for coupling said switch to said switch-actuating assembly for operation thereby when said cams are brought into concurrent cooperation.

3. A switching device in accordance with claim 2, wherein said members are mounted for displacement perpendicular to said parallel planes and said cams are fixed to said members.

4. A switching device in accordance with claim 2, wherein said cams are movable relative to their respective members and are at intervals aligned in a column for thrust transmission to said switch.

5. A switching device operable at intervals, comprising a gear assembly including plural gears supported for rotation about a common axis and for mutual displacement along the axis, each of said gears except one having a first cam of limited arcuate extent fixed thereon and projecting laterally and each of said gears except one having a companion cam fixed thereon for cooperation at times, with said first cam of the next adjacent gear, said gears being of at least approximately equal diameter but having respectively different numbers of teeth, a common elongated driving pinion meshed with said gears for effecting differential rotation thereof so that said first cam and its companion cam are brought into cooperation with each other only at intervals and cause axial expansion of said plural gears, and switch, said switching device including means for coupling said switch mechanically to said gear assembly for operation by said gears upon axial expansion thereof, the portions of said first cam and its companion cam that cooperate in fully effective relationship for producing switch operation being individually no greater in arcuate extent than the arc of rotation of each gear relative to the next adjacent gear, measured at the completion of one rotation of the slower of each gear and its next adjacent gear.

6. A switching device in accordance with claim 5, wherein said assembly includes a coupling element movable in the switch actuating direction by said gears upon collective expansion thereof, a spring for biasing said coupling element in the switch-releasing direction to reverse said expansion when the cams and companion cams are not in cooperation, and stop means limiting the movement of said coupling element under bias of said spring upon displacement of said cams and said companion cams out of cooperation.

7. A switching device in accordance with claim 5, including spacing means between each gear and the next adjacent gear for preventing contact of any of said cams with the lateral face of the next-adjacent gear.

8. A switching device in accordance with claim 5, including a second switch having an actuator disposed laterally of a gear of said gear assembly and arranged for actuation by expansion of less than all of said plurality of gears.

9. A switching device in accordance with claim 5 including an axially slidable shaft supporting said axially aligned gears, all but one of said gears being axially slidable relative to said shaft, said one gear being an end one of said coaxially aligned gears, means for enforcing axial displacement of said shaft by said one gear upon expansion of said gear assembly axially due to concurrent cooperation of each said first cam with its companion cam, and means constraining the end gear remote from said one gear against axial displacement relative to said switch so that axial expansion of said gear assembly displaces said shaft axially and causes said shaft to operate said switch.

10. A switching device in accordance with claim 9, wherein said one gear is rigidly secured to said shaft.

11. A switching device in accordance with claim 9 wherein said plural gears include at least three gears having respectively different numbers of teeth.

12. A switching device in accordance with claim 5, wherein said gear assembly includes at least three gears and including means constraining said gears against tilting relative to said axis, wherein a gear at one end of said gear assembly is blocked against axial motion during switch actuation by the gear assembly, and wherein said coupling means includes an axially disposed and axially movable part operable by the gear of said gear assembly that is most remote from said one gear.

13. A switching device operable at intervals, comprising a gear assembly including plural gears supported for rotation about a common axis and for mutual displacement along the axis, each of said gears except one having a first cam and at least one additional first cam of limited arcuate extent spaced apart arcuately and fixed thereon and projecting laterally and each of the gears except one having a companion cam and at least one additional companion cam correspondingly spaced apart arcuately on the next adjacent gear and fixed thereon and cooperable concurrently with said first cam and said additional first cam for effecting balanced axial thrust against their respective gears when the first cams are concurrently brought by the gears into cooperation with said companion gears, said gears being of at least approximately equal diameter but having respectively different numbers of teeth, a common elongated driving pinion meshed with said gears for effecting differential rotation thereof so that first cam and said additional first cam are brought into cooperation with a respective companion cam and additional companion cam only at intervals and cause axial expansion of said plural gears, and a switch, said switching device including means for coupling said switch mechanically to said gear assembly for operation by said gears upon axial expansion thereof.

14. A switching device in accordance with claim 13, wherein said coupling means bears axially against said coupling means bears axially against said coaxial gears.

15. A switching device in accordance with claim 13, including axial spring means for biasing the elements of said gear assembly into mutual lateral contact both when the cams and companion cams are in cooperation and in the time intervals between such cam cooperation.

16. A switching device in accordance with claim 13, wherein said first cam of each gear and its companion cam of the next adjacent gear are disposed at a first common radius, and wherein said additional first cam and its additional companion cam are disposed at a second common radius that differs substantially from said first common radius so that each said first cam of the gear assembly cooperates only with its companion cam and each said additional first cam of the gear assembly cooperates only with its additional companion cam during a full rotation of each said gear in relation to its said adjacent gear.

17. A switching device in accordance with claim 13 wherein said plural gears include at least three gears having respectively different numbers of teeth.

18. A switching device in accordance with claim 13 wherein said coupling means includes a shaft supporting said gears for relative axial movement and for relative rotation, said shaft being arranged to operate said switch when moved axially in one direction, means providing switch-actuating coupling between said shaft and a gear at one end of said coaxial gear assembly, and means constraining the gear at the opposite end of said coaxial gear assembly against axial displacement relative to the switch so that axial expansion of said gear assembly displaces the shaft axially and causes said shaft to operate said switch.

19. A switching device in accordance with claim 16 wherein the portion of each of said pairs of cooperable first and companion cams has an arcuate extent, when fully effective for producing switch operation, no greater than the arc of differential rotation of each said first cam relative to its companion cam, measured at the completion of one rotation of the slower cam of its respective pair, and wherein said plural gears include at least three gears having respectively different numbers of teeth.

20. A switching device including a switch actuating assembly and a switch operable thereby, said assembly having a pair of cams and means supporting the cams for rotation about a common axis and for relative movement at least approximately parallel to said axis, said cams being laterally cooperable with each other to cause switch-actuating motion of at least one of said cams at least approximately parallel to the axis when the cams come into switch-actuating cooperation, and means including a primary drive unit coupled to both of said cams for rotating said cams at different rates to bring the cams into mutual cooperation at intervals, the portions of said cams that cooperate when fully effective for producing switch operation being individually no greater in arcuate extent than the arc of differential rotation of each said first cam relative to its companion cam, measured at the completion of one rotation of the slower cam of the pair, said switching device including means coupling one of said cams to said switch for actuating the latter by switch-actuating motion in one direction at least approximately parallel to said axis, and said switching device including means blocking shifting of the other of said cams in the opposite direction.

21. A switching device including a switch-actuating assembly and a switch operable thereby, said assembly having at least first and second pairs of cams, means for supporting said cams for rotary motion about a common axis and for relative movement parallel to said axis, the cams of each pair being laterally cooperable with each other to cause switch-actuating motion of at least one cam of the first pair parallel to the axis and to produce relative motion of the cams of the second pair parallel to the axis when each said pair of cams is brought into mutual switch-actuating cooperation, said switch-actuating assembly including means limiting said lateral cam motion to be substantially parallel to said axis, and said switch-actuating assembly having means including a primary drive unit and means coupling said drive unit individually to said cams for moving said cams of the first pair about said axis at different rates and for moving the cams of the second pair about the axis at rates different from each other and different from at least one cam of said first pair to bring the cams of each pair into mutual cooperation at intervals different from the intervals at which the cams of the second pair come into mutual cooperation, said switching device including means coupling one of the cams of the first pair to the switch for actuating the latter by switch-actuating motion parallel to the axis, said switching device including means blocking the other of said cams of the first pair against motion in the opposite direction, the cams of said second pair being interposed in said switch-actuating coupling means for actuating the switch only when said pairs of cams are concurrently driven into their mutual switch-actuating relationship.

References Cited

UNITED STATES PATENTS

| | | | |
|---|---|---|---|
| 2,458,853 | 1/1949 | Hughes | 200—38 |
| 2,574,841 | 11/1951 | Powell et al. | 200—38 XR |
| 2,921,151 | 1/1960 | Kral | 200—38 |
| 3,170,330 | 2/1965 | Reinecke | 200—38 XR |
| 3,320,375 | 5/1967 | Aldrich et al. | 200—38 XR |

ROBERT K. SCHAEFER, *Primary Examiner.*

H. O. JONES, *Assistant Examiner.*